United States Patent [19]

Hoffman

[11] Patent Number: 4,519,372
[45] Date of Patent: May 28, 1985

[54] GAS INJECTION VALVE

[76] Inventor: James E. Hoffman, 6000 Linwood, Odessa, Tex. 79763

[21] Appl. No.: 522,862

[22] Filed: Aug. 12, 1983

[51] Int. Cl.³ ............................................. F02M 61/14
[52] U.S. Cl. ..................................... 123/470; 239/453
[58] Field of Search ........................ 123/470, 468, 469; 239/453, 600, 533.3, 533.4, 533.5, 533.6, 533.7, 533.8, 533.9, 533.11, 533.12, 533.13

[56] References Cited

U.S. PATENT DOCUMENTS

| | | | |
|---|---|---|---|
| 1,393,090 | 10/1921 | Cowardin et al. | 239/453 |
| 1,589,245 | 6/1926 | Scott | 239/533.6 |
| 1,777,051 | 9/1930 | Scott | 239/533.6 |
| 1,786,946 | 12/1930 | Hofmann | 123/294 |
| 2,750,957 | 6/1956 | Tavola | 239/533.11 |
| 2,921,746 | 1/1960 | Burman | 239/453 |
| 2,986,342 | 5/1961 | Dahl | 239/453 |
| 3,095,153 | 6/1963 | Soth | 239/405 |
| 3,224,684 | 12/1965 | Roosa | 239/453 |
| 3,244,377 | 4/1966 | Roosa | 239/533.3 |
| 3,409,225 | 11/1968 | Maddalozzo et al. | 239/89 |
| 4,149,506 | 3/1979 | Muntean et al. | 239/533.7 |
| 4,306,681 | 12/1981 | Laitio et al. | 239/533.3 |
| 4,365,756 | 12/1982 | Fisher | 239/533.2 |

Primary Examiner—Ira S. Lazarus
Assistant Examiner—R. S. Bailey
Attorney, Agent, or Firm—Marcus L. Bates

[57] ABSTRACT

A flow control valve assembly is connected to the cylinder head of a gas engine for providing an intermittent flow of gaseous fuel in timed relationship to the combustion chamber thereof. A valve cage is removably affixed to the cylinder head, and removably receives a valve cartridge in a telescoping manner therewithin. The valve cartridge cooperates with the valve cage in a manner whereby gaseous fuel flows into the cage, through ports formed in the cartridge, and from the interior of the cartridge into the combustion chamber of the gas engine. The valve cartridge includes a main outer housing which is easily separable into two members. A special seal assembly is received in captured relationship between a valve stem and the two separable members. The unique arrangement of the various components of the cartridge enables the device to be overhauled in a simple and straight forward manner.

13 Claims, 7 Drawing Figures

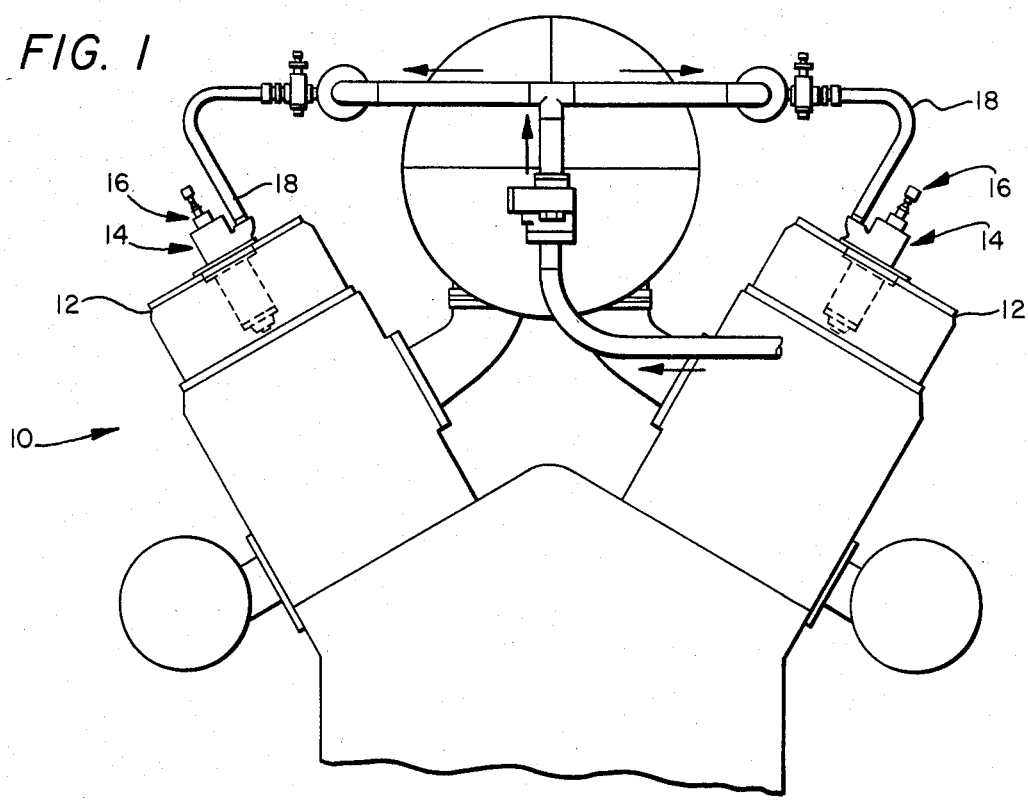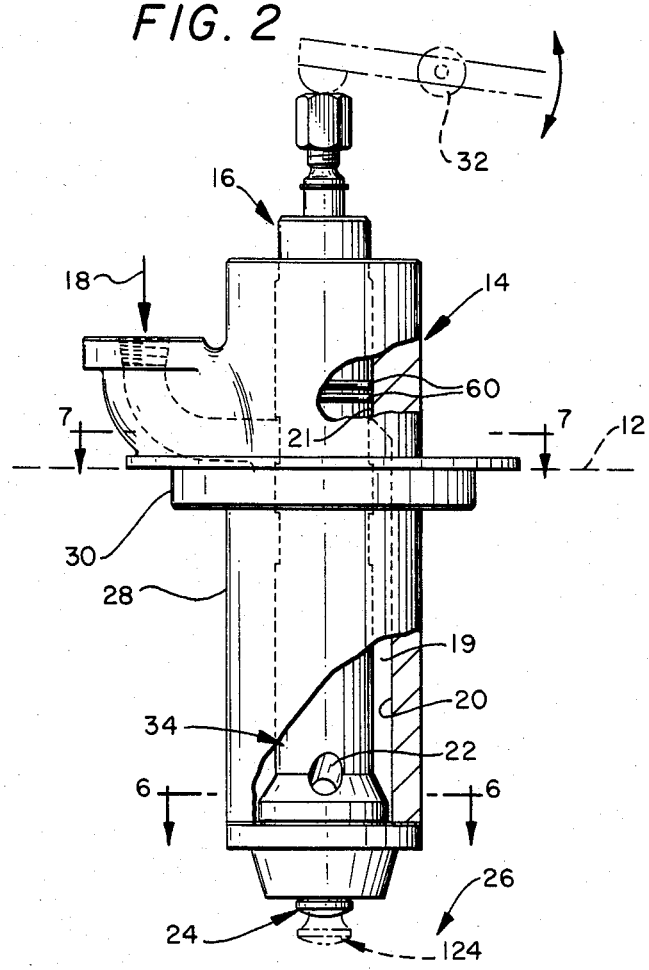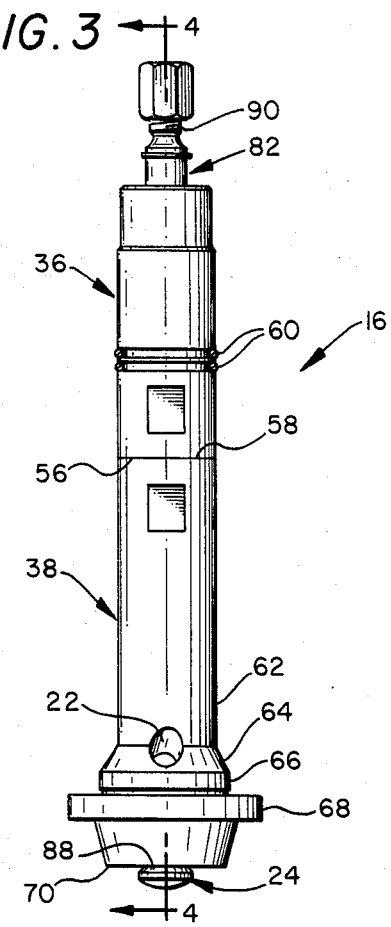

GAS INJECTION VALVE

BACKGROUND OF THE INVENTION

Large reciprocating gas engines, such as the Cooper-Bessemer gas compressor engine GMVA, utilize natural gas or other gaseous fuel for the combustion gases. Each of the combustion cylinders employs an independent fuel control valve assembly for controlling the flow of gaseous fuel into the combustion chamber so that an appropriate amount of gaseous fuel can be admixed with an appropriate amount of air each combustion cycle thereof.

The fuel valve assembly associated with each cylinder usually includes a valve cage, or adaptor means, by which a valve cartridge, or fuel inlet control valve, can be removably affixed to the cylinder head. The valve cartridge includes a valve stem arranged axially respective to the longitudinal central axis of the cartridge, with there being means at one end of the stem for imparting axial movement into the valve stem. The other end of the valve stem includes a valve element which is seated against a valve seat located at the lower end of the cartridge.

From time to time, the valve cartridge must be replaced because one or more components thereof have become unduly worn or inoperative. Replacement of the valve cartridge necessitates shutting the gas engine down, removing the valve cage, and thereafter removing the valve cartridge from the valve cage. A new valve cartridge is usually substituted for the removed valve cartridge, and the entire assembly is replaced onto the cylinder head of the gas engine. The old valve cartridge is usually returned to an appropriate facility, such as the manufacturer to be rebuilt. The replacement of a valve cartridge is expensive. Should the gas engine be rendered inoperative for a considerable period of time while awaiting the arrival of one or more new gas cartridges, a loss of considerable amount of revenue is represented by the dormant gas engine.

It would be desirable to have made available a gas cartridge which is simple in design, easily overhauled in the field, and which can be rebuilt without the necessity of the employment of special machine shop equipment or the like. A unique valve cartridge which achieves these desirable goals is the subject of the present invention.

THE PRIOR ART

Fisher Pat. No. 3,465,756 discloses a valve assembly for a reciprocating gas engine which is broadly representative of the prior art type of valve cage and valve cartridge contemplated by the present invention. The valve cartridge of the Fisher disclosure must be unscrewed from the valve cage, and there is no unitary seal assembly disclosed in Fisher which can be removed by separating the housing of the valve cartridge in the manner contemplated by the present invention.

Dahl Pat. No. 2,986,342; Burman Pat. No. 2,921,746; and Hofmann Pat. No. 1,786,946 are other examples of fuel control devices for controlling the flow of combustion fuel to a reciprocating engine. None of these prior art references disclose a unitary seal which cooperates with the main body of a valve cartridge as contemplated by applicant.

Laitio Pat. No. 4,306,681; Muntean et al Pat. No. 4,149,506; Maddalozzo et al Pat. No. 3,409,225; and Soth Pat. No. 3,095,153 are other prior art examples of various different fuel control devices of which applicant is aware.

SUMMARY OF THE INVENTION

A valve cartridge, or flow control valve assembly, is removably received within a valve cage, or adaptor housing. The valve cartridge controls the intermittent flow of combustion gases from the valve cage, through the valve cartridge, and into the combustion chamber of an internal combustion engine. The valve cartridge has a minimum of component parts and can be easily removed from the valve cage. The valve cartridge is easily disassembled to enable the critical components thereof to be replaced, whereupon the valve cartridge can thereafter be reassembled, returned to the valve cage, and the operation of the internal combustion engine resumed. The unique design of the valve cartridge enables field repair thereof to be carried out in a rapid, economical, and straight forward manner.

The valve cartridge of this invention includes a main body which forms an outer main housing, with there being an axial passageway extending longitudinally through the main body. The main body is axially separable into an upper and a lower member, with that part of the axial passageway extending through the upper member forming a valve stem guide, and some part of the passageway extending through the lower member forming an inner annular gas chamber through which combustible gases from the valve cage can flow. The gas flows through a port formed in the lower member, into the inner annular gas chamber of the valve cartridge, through a valve seat, and into the combustion chamber of the gas engine.

A removable valve seat is located at the lower extremity of the lower member, and means located at the upper extremity of the cartridge enables the valve stem to be reciprocated within the axial passageway. The main body includes a seal receiving chamber formed at the confronting ends of the upper and lower members thereof. A unitary seal assembly is captured within the seal chamber and sealingly engages a medial length of the valve stem and the circumferentially extending inner wall surface of the seal cavity, thereby precluding the flow of gases across the seal assembly.

The port which is formed through the sidewall of the lower member is placed in communication with an inner annular gas chamber formed at the interior part of the lower member and near the seat of the valve cage so that combustion gases flowing into the gas cage is conducted through the inlet port, into the inner annulus, through the valve seat, and into the combustion chamber.

This unique combination of elements enable the valve cartridge to be removed from the valve cage; the valve stem, unitized seal assembly, and seat renewed; and, thereafter the valve cartridge replaced within the valve cage in an unobvious manner heretofore unattainable with the above prior art valve devices.

Accordingly, a primary object of the present invention is the provision of improvements in a combination valve cage and valve cartridge which enables field repair of the valve cartridge to be carried out in a new and unexpected manner.

Another object of the invention is to provide a valve cartridge for an internal combustion engine which can be rapidly field repaired with a minimum of tools and expertise.

A further object of this invention is to disclose and provide a valve cartridge having an improved and unobvious seal assembly, valve stem, and valve seat arranged in a manner to be readily replaced in the field.

A still further object of this invention is the provision of a valve cartridge having a unitary seal assembly removably captured within a seal cavity formed at the confronting ends of separable main housing members which enables all of the internal seals of the valve cartridge to be rapidly replaced.

Another and still further object of this invention is the provision of a valve cartridge having the components thereof made to cooperate with one another in a manner to endure operation for an extended length of time, and which enables the valve cartridge to readily be overhauled with the use of a minimum of tools and expertise.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 is a fragmentary, part diagrammatical, part schematical, end view of a gas engine having a valve cartridge and valve cage associated therewith made in accordance with the present invention;

FIG. 2 is an enlarged, side elevational view of a valve cage and valve cartridge made in accordance with the present invention; with some parts being removed therefrom, and some of the remaining parts shown in cross-section;

FIG. 3 is a side elevational view of the valve cartridge disclosed in the foregoing figures;

DETAILED DESCRIPTION OF THE PREFERRED EMBODIMENTS

Figure 4:
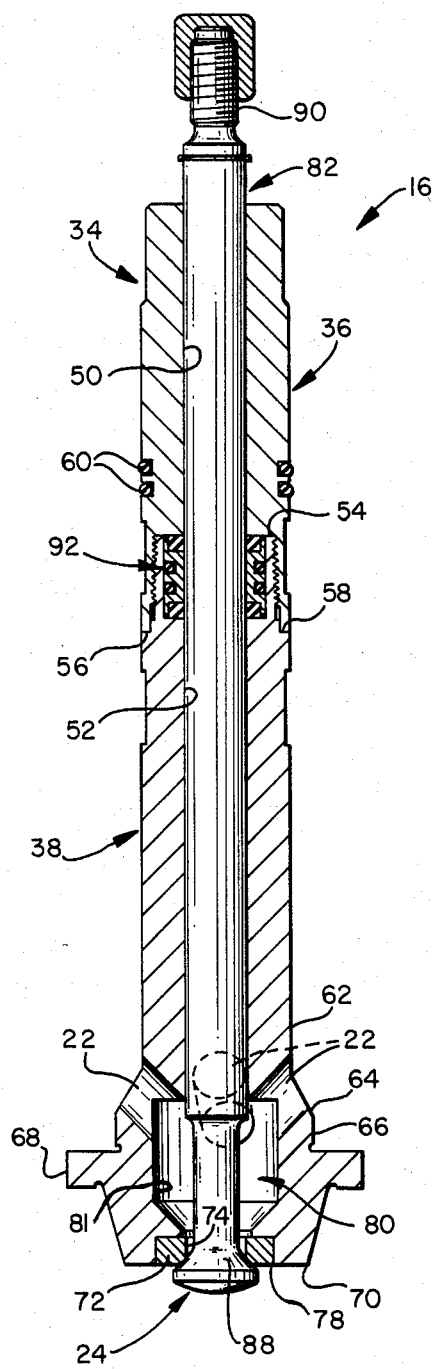
FIG. 4 is a cross-sectional view taken along line 4—4 of FIG. 3.
Figure 6:
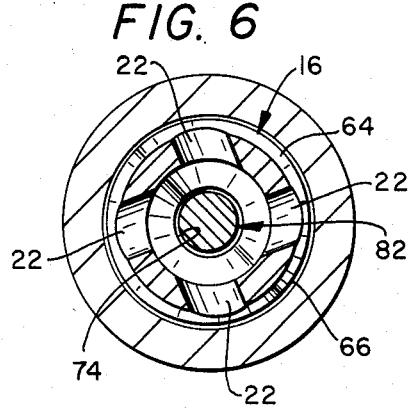
Figure 7:
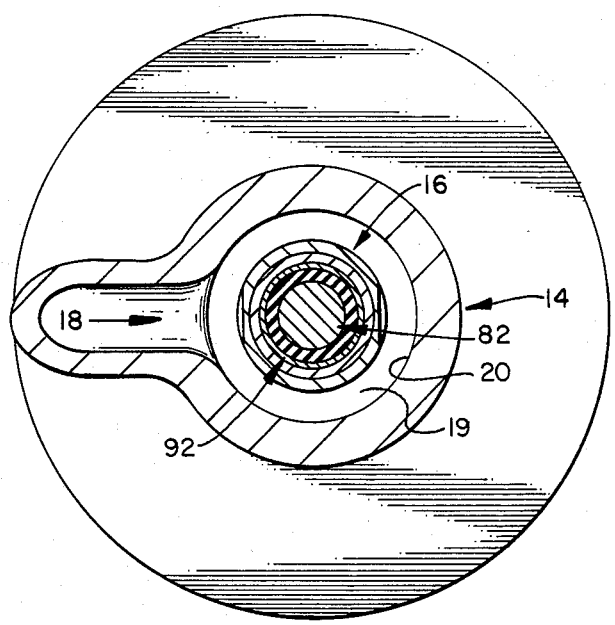

In FIG. 1 of the drawings, there is disclosed a gas engine 10, as for example a Cooper-Bessemer gas engine, having a plurality of combustion cylinders 12 for combusting a mixture of gas and air therewithin. Each cylinder 12 includes a valve cage 14 removably mounted thereto. A valve cartridge 16 is removably affixed to each valve cage 14. The valve cartridge 16 controls the intermittent flow of gaseous fuel in timed relationship to the cylinders 12. Numeral 18 indicates a gas inlet conduit which can take on any number of different forms, and within which gas at a suitable pressure is conducted to each of the valve cages.

In FIG. 2, numeral 19 indicates an annular gas passageway formed between the lower marginal end of the gas cage and gas cartridge. The passageway 19 is in communication with the gas inlet 18. The lower marginal end of the gas cage has an inside diameter 20 considerably larger than the outside diameter of the lower marginal end of the valve cartridge. Numeral 21 indicates the reduced inside diameter marginal length of the upper end of the valve cage which sealingly receives the upper marginal end of the valve cartridge in a telescoping manner therewithin. Gas inlet ports 22 conduct combustion gases from annulus 19 into the interior of the valve cartridge. The gas ports 22 are arranged more or less tangentially respective to the wall 20 of the cage 14.

The valve cartridge includes a valve stem having a valve head or valve element 24 movable in a reciprocating manner from the illustrated sealed or seated position into the illustrated dot-dash opened position indicated by numeral 124. Numeral 26 broadly indicates one possible location of the combustion chamber of a cylinder 12 of the gas engine.

The lower marginal end of the gas valve cage 14 is provided with an outside diameter 28 which can be slidably received within a complementary formed opening within the cylinder head of the cylinder 12. A seating boss 30 sealingly engages the upper end of the cylinder head. A rocker arm assembly 32, when rocked by a push-rod, reciprocates the valve stem respective to a main body 34 of the valve cartridge.

Figure 5:
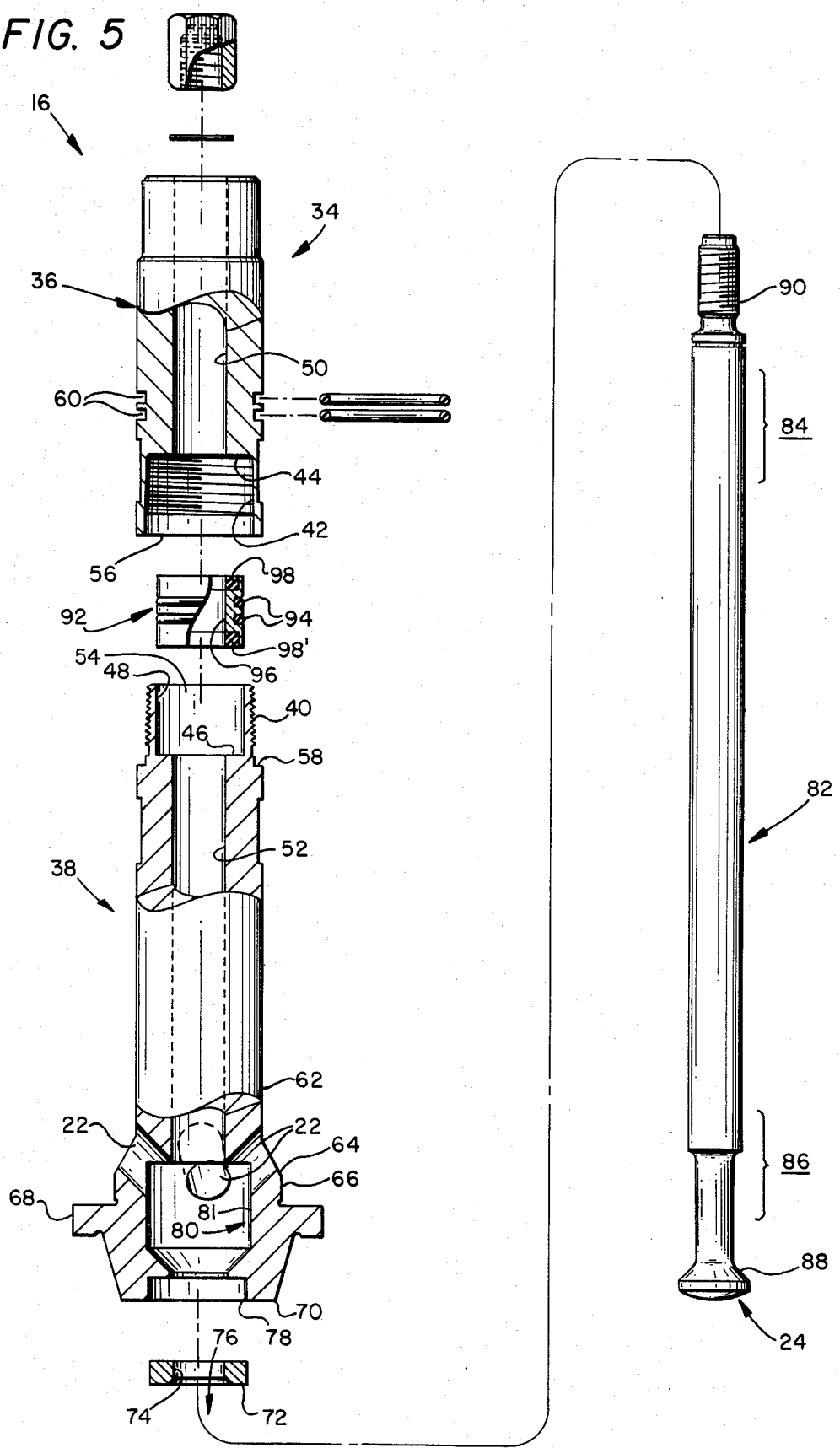
FIG. 5 is an exploded, part cross-sectional view of the valve cartridge apparatus disclosed in the foregoing figures; and, FIGS. 6 and 7, respectively, are cross-sectional views taken along lines 6—6 and 7—7, respectively, of FIG. 2.

As best seen illustrated in FIGS. 3, 4, and 5, the main body of the valve cartridge includes an upper member 36 and a lower member 38. The upper and lower members 36 and 38 of the main body are separable one from the other in the illustrated manner set forth in FIG. 5, and the confronting marginal ends thereof are telescoped together by means of a male threaded surface 40 and a complementary female threaded surface 42. Confronting spaced shoulders 44 and 46, respectively, are formed on the upper and lower members 36 and 38, respectively, and are precisely spaced from one another for reasons which will be better appreciated later on in this disclosure.

A seal receiving chamber is formed within the interioral marginal confronting members 36 and 38 by the opposed confronting shoulders 44 and 46, together with sidewall 48 of lower member 38. The chamber sidewall 48 is reduced in diameter at the shoulder 46. An axial passageway 50, formed axially through the upper member 36, cooperates with the valve stem to form an upper valve guide; and, reduces into a larger inside diameter at 44 to form the seal cavity. The passageway 52 formed axially through the lower member forms a lower valve guide and enlarges near ports 22 to provide an inner annular passageway 80 within the interior of the valve cartridge.

The upper terminal end 54 of the lower member 38 and the lower terminal end 56 of the upper member 36 therefore confront one another when the upper and lower members are disassembled one from the other and axially aligned respective to one another. Shoulder 58 is formed externally about member 38 and abuttingly engages the illustrated shoulder formed at the lower edge portion 56 of the upper member, thereby precisely spacing the seal engaging shoulders 44 and 46 of the cavity from one another.

O-ring grooves 60 receive O-ring seals therein for sealing the upper member of the cartridge to the upper reduced diameter axial passageway 21 of the valve cage in the illustrated manner of FIG. 2.

Numeral 62 indicates the reduced outside diameter wall portion of the lower member which cooperates with the inner peripheral wall surface 20 of the valve cage to form the before mentioned outer annular gas passageway 19. At least one gas port 22 communicates the annular gas passageway 19 with the inner annular gas passageway 80 being between the valve stem and the wall 81 of the lower member. The ports 22 preferably are formed through the sloped wall portion 64 located between the vertical wall portions 62 and 66 of the lower member 38. An outwardly directed flange 68 provides a stop means which is abuttingly received against the lower circumferentially extending edge portion of the valve cage. The lowermost end 70 of the valve cartridge is exposed to the combustion chamber of the gas engine. A removable valve seat 72, preferably of annular construction, includes axial passageway 74 formed therethrough in aligned relationship respective to the valve stem and main body. Numeral 76 broadly indicates the flow of combustion gases from the interior of the cartridge into the engine combustion chamber. The passageway 74 has an outer conical face formed at 45° and ground and lapped to receive the valve element 24. Numeral 78 indicates a close tolerance bore which forms an interference fit between the removable valve seat 72 and the lower end of the lower member 38.

The valve stem 24 preferably is of integral construction and includes an elongated shaft or stem 82 having at least a medial area 84 thereof which is received in close tolerance relationship respective to the reduced diameter passageways 50 and 52 of the upper and lower members 36 and 38. The lower marginal end of the valve stem preferably is reduced in diameter, as indicated by numeral 86, to thereby enable a 45° valve face 88 to be formed at the marginal terminal end thereof, with the valve face 88 being made complementary respective to a similar contoured seat formed on the outer face of valve seat 72 at passageway 74. The upper terminal end 90 of the valve stem is provided with means by which the valve stem can be reciprocated by the before mentioned rocker assembly 32. In the illustration of FIG. 5, the upper marginal end at 90 has been threaded for purposes of illustration to disclose one means by which a suitable valve spring, retainer, and wear surface can be affixed thereto, as is known to those skilled in the art.

A seal assembly 92 of annular construction is of a size to sealingly engage the outside diameter 82 of the valve stem, and the inside diameter 48 of the seal cavity, while at the same time the opposed ends of the seal assembly is abuttingly received in close tolerance relationship respective to the confronting shoulders 44 and 46. The seal cavity positions the seal 92 at the transition between the valve guide passageways 50 and 52. As best seen illustrated in FIG. 5, o-ring grooves are formed at 94 for sealingly engaging the seal receiving cavity wall 48. The seal includes an internal axial passageway which is axially aligned with the passageway formed through the main body, with there being an increased inside diameter marginal length which form opposed counterbores at 98, 98' for removably receiving the illustrated internal spaced apart confronting seals therewithin. The spaced seals at 98 and 98' of the seal assembly 92 sealingly engage two spaced marginal lengths along the valve stem at a location below the valve guide passageway 50 of the upper member. The seals 98 and 98' preferably are U-shaped seals having an o-ring received therein which bear against shoulders 44 and 46 as the opposed ends of the seal body abuttingly engage the walls 44 and 46. The seals 94 are o-rings seals which seal against the cavity wall 48.

It is essential that the longitudinal length of the seal body or housing 92 be slightly in excess of the distance measured between shoulders 44 and 46, so that the opposed ends of the faces of seals 98 and 98' of the seal assembly are tightly engaged by the confronting shoulders 44 and 46. At the same time, it is essential that the inside diameter 48 of the seal cavity be of a size to sealingly engage the o-rings placed in o-ring grooves 94 of the body of the seal assembly, and that the inner circumferentially extending surface of the seals 98, 98' sealingly engage the valve stem 82.

The valve face 88 and valve seat 74 preferably are of the illustrated configuration seen in FIG. 5, which provides enormous strength between the seating surface at 88 all the way back to the upper end of the valve stem, thereby precluding the valve face from ever parting from the valve stem.

OPERATION

In order to retrofit the valve cartridge 34 to an existing valve cage 14, it is necessary to modify the configuration of the old cage to receive the cartridge in the manner of FIG. 2. It is preferred however, to fabricate a valve cage into several different configurations which enable a cartridge 34 to be used in conjunction with a plurality of different gas engines. The configuration of the cage 14 and cartridge 16 necessitates that the cage flange 30 be located respective to the combustion chamber to preclude the engine piston from contacting the open valve 124, and furthermore, it is necessary that the cage 14 properly align the upper end 90 of the valve stem with the reciprocating mechanism 32. It is further necessary that the gas supply 18 be properly conducted to the port 22 of the cartridge.

When the gas engine operator decides that it is time to rebuild the valve cartridge, the cartridge is removed from the cage by telescoping the cartridge in a downward direction respective to the cage, and thereafter parting the upper member 36 from the lower member 38. The valve stem 24 is then removed by telescoping the stem in a downward direction through passageway 74 of the seat 72. The seal assembly 92 is easily pushed from shoulder 46 and a new seal assembly substituted therefor, or the seals 94, 98 may be renewed on the old seal housing. At the same time, the o-rings at 60 are replaced. Seat 72 can be reground or lapped, or replaced as may be necessary. The seat 72 is driven from the lower marginal end of the lower member and a new seat repositioned thereon by utilizing common ordinary mechanic tools. Thereafter, the upper and lower members are made up with a new seal being abuttingly engaged by the confronting shoulders at 44, and 46; and, thereafter the valve stem 24 is replaced within the valve cartridge. The valve springs and keepers (not shown) are replaced at the upper end of the cartridge so that there is no danger of the valve stem falling into the cylinder during assembly. The cartridge is replaced within the cage, and the cage fitted to the cylinder, after which the engine can then be returned to service.

The present invention provides a valve cartridge having an unexpected long life, which needs no lubrication, and which is comparatively inexpensive to completely overhaul. The valve cartridge has the advantage of being repairable in the field by using ordinary mechanics tools. It is therefore unnecessary for the engine mechanic to order a complete set of new cartridges in expectation of an engine overhaul. Instead, the engine mechanic can provide himself with an overhaul kit comprised of the valve seat, the valve stem, and the seals. The valve cartridges can individually be field overhauled by replacement of the necessary components in the above manner thereby effecting considerable economy in the overhaul.

I claim:

1. In a gas engine having a cylinder head to which there is attached a valve cage, and a valve cartridge supported within the cage, wherein gaseous fuel can be connected to flow into the cage and through the cartridge, the combination with the cage of a valve cartridge for controlling fuel flow from the cage into a combustion chamber associated with the cylinder head;

said valve cartridge includes a main housing for support of said cartridge respective to a cage, a valve stem reciprocatingly received within said main housing, a valve seat affixed to the lower end of said main housing, seal means between said main housing and said stem;

said main housing has an axial passageway formed therethrough with said stem and seal means and seat being axially aligned therewith;

said main housing being separable into upper and lower members, with said seat being formed at the lower terminal end of the lower member, and with there being a valve element at one end of the valve stem which sealingly engages said seat when the valve stem is reciprocated to the open position; means attaching the confronting ends of said upper and lower members together, a seal chamber formed in the marginal confronting ends of said upper and lower members, a unitized seal assembly removably received within said seal chamber;

said seal assembly has an internal seal means which sealingly engages a medial length of said valve stem, and an external seal means which sealingly engages a circumferentially extending wall formed on the interior of said seal chamber;

the axial passageway through said upper members form a valve stem guide; said axial passageway enlarges so it passes through the lower marginal end of said lower member and forms an annular gas passageway;

means forming a gas inlet port which extends through said main body and into said annular gas passageway;

said valve seat is in communication with said annular gas passageway; whereby, said main housing can be separated into said upper and lower members to enable said seal assembly to be removed from the cartridge.

2. The combination of claim 1 wherein the upper marginal end of the lower member is telescopingly received within the lower marginal end of the upper member, and further including a shoulder formed on the lower member for engaging the lower terminal end of the upper member to thereby precisely space the confronting shoulders within the valve cavity so that the seal assembly can be received in close tolerance relationship respective thereto.

3. The combination of claim 2 wherein said seal assembly is an elongated annular cylinder having internal opposed seal means therewithin for sealingly engaging a medial length of said valve stem, and external seal means therewithout for sealingly engaging the interior wall of said seal cavity;

the opposed ends of the seal housing are arranged whereby the opposed seal means thereof sealingly engage the opposed ends of the seal cavity;

said upper member has a reduced diameter passageway formed therethrough which forms a guide for guidably receiving the upper marginal length of the valve stem, while a portion of the passageway the lower member is radially spaced from the valve stem to form an internal annular gas passageway through which gas can flow from said port into the internal annulus and through the valve seat when the valve stem has been moved to an open position.

4. The combination of claim 1 wherein said seal assembly is an elongated annular cylinder having internal opposed seal means therewithin for sealingly engaging a medial length of said valve stem, and external seal means therewithout for sealingly engaging the interior wall of said seal cavity;

the opposed ends of the seal housing are arranged whereby the opposed seal means thereof sealingly engage the opposed ends of the seal cavity.

5. The combination of claim 1 wherein said upper member has a reduced diameter passageway formed therethrough which forms a guide for guidably receiving the upper marginal length of the valve stem, while a portion of the passageway the lower member is radially spaced from the valve stem to form an internal annular gas passageway through which gas can flow from said port into the internal annulus and through the valve seat when the valve stem has been moved to an open position.

6. In a gas engine having a cylinder head to which there is attached a valve cage, a valve cartridge mounted to said valve cage, passageway means wherein gaseous fuel can be connected to flow through the cage and into the valve cartridge while the cartridge controls fuel flow from the cage into a combustion chamber associated with the cylinder head, the improvement comprising:

said cartridge includes an exterior main housing, an elongated valve stem assembly, a seal assembly, a valve seat; said main housing has an axial passageway formed therethrough with said stem, seal assembly, and seat being axially aligned therewith; said valve stem is reciprocatingly received within the passageway of said main housing, said valve seat is affixed to the lower end of said main housing with said seal assembly located between said main housing and said stem;

said main housing being separable into an upper and lower member, said seal is formed at the lower terminal end of said lower member, said valve element sealingly engages said seat when the valve stem is reciprocated to the closed position; means removably attaching the confronting ends of said upper and lower members together, a seal chamber formed in the marginal confronting ends of said upper and lower members, said seal assembly being removably received within said seal chamber;

said seal assembly has an internal seal which sealingly engages a marginal length of said valve stem, and an external seal which sealingly engages a marginal length of the interior of said passageway;

the axial passageway through said upper member forms a valve stem guide and the axial passageway through said lower member forms an annular passageway adjacent to said seat, and a port formed in the lower member through which combustion gas can flow into said annular passageway.

7. The improvement of claim 6 wherein the upper marginal end of the lower member is telescopingly received within the lower marginal end of the upper member, and further including a shoulder formed on the lower member for engaging the lower terminal end of the upper member to thereby precisely space the confronting shoulders within the valve cavity so that the seal assembly can be received in close tolerance relationship respective thereto.

8. The improvement of claim 7 wherein said seal assembly is an elongated annular cylinder having internal opposed seal means therewithin for sealingly engaging a medial length of said valve stem, and external seal means therewithout for sealingly engaging the interior wall of said seal cavity;

the opposed ends of the seal housing are arranged whereby the opposed seal means thereof sealingly engage the opposed ends of the seal cavity;

said upper member has a reduced diameter passageway formed therethrough which forms a guide for guidably receiving the upper marginal length of the valve stem, while a portion of the passageway the lower member is radially spaced from the valve stem to form an internal annular gas passageway through which gas can flow from said port into the internal annulus and through the valve seat when the valve stem has been moved to an open position.

9. The improvement of claim 6 wherein said seal assembly is an elongated annular cylinder having internal opposed seal means therewithin for sealingly engaging a medial length of said valve stem, and external seal means therewithout for sealingly engaging the interior wall of said seal cavity;

the opposed ends of the seal housing are arranged whereby the opposed seal means thereof sealingly engage the opposed ends of the seal cavity.

10. The improvement of claim 6 wherein said upper member has a reduced diameter passageway formed therethrough which forms a guide for guidably receiving the upper marginal length of the valve stem, while a portion of the passageway the lower member is radially spaced from the valve stem to form an internal annular gas passageway through which gas can flow from said port into the internal annulus and through the valve seat when the valve stem has been moved to an open position.

11. A valve cartridge for use in controlling the flow of combustion gases to a gas engine, comprising:

a main housing having a configuration which enables the housing to be removably received in operative relationship respective to a cylinder head of a gas engine; a longitudinally extending axial passageway formed through said main housing, a valve stem having a valve element formed at one end thereof and an opposed end by which the valve stem can be reciprocated;

a removable seal assembly for sealingly engaging a medial length of the outer surface of the valve stem and a medial length of the inner surface of the main housing axial passageway;

a valve seat removably affixed to the lower end of said valve cartridge for sealingly engaging said valve element;

said main housing includes an upper member and a lower member affixed to one another in a removable manner, with said lower member having an internal circumferentially extending shoulder and said upper member having an internal circumferentially extending shoulder axially spaced from the shoulder of the lower member; means forming a seal cavity between the shoulder of the upper member and the shoulder of the lower member;

said axial passageway having a relative small inside diameter through said upper member for forming a valve stem guide, and a relative large inside diameter through said lower member for forming an annular gas passageway; means forming an inlet port into said lower member at a location between said seat and seal cavity through which combustion gas can flow into the large diameter axial passageway;

said seal assembly is an elongated cylinder having upper and lower opposed ends, respectively, which abuttingly engage the shoulder of said upper and lower members, respectively;

said seal assembly further includes spaced, opposed seal means formed at the opposed marginal terminal ends thereof for concurrently sealingly engaging the outer surface of the valve stem and the shoulder of the upper and lower members; seal means formed about the exterior of the seal assembly for sealingly engaging the interior wall of the seal cavity; whereby said seal assembly sealingly engages a medial length of the valve stem, the shoulder of the upper and lower members, and the interior wall of the seal cavity.

12. The cartridge of claim 11 wherein said seal cavity is formed by enlarging the upper portion of the passageway located in the lower member so that the wall forming the passageway is radially spaced from the valve stem, said annular gas passageway is formed in axially spaced relationship respective to said seal cavity and provides a passageway through which gas can flow from said port into the internal annulus and through the valve seat when the valve stem has been moved to an open position.

13. A valve cartridge for use in controlling the flow of combustion gases to a gas engine, comprising:

a main housing adapted to be removably received in operative relationship respective to a cylinder head of a gas engine; a longitudinally extending axial passageway formed through said main housing, a valve stem, a valve element formed at one end of said valve stem, means at an opposed end of said valve stem by which the valve stem can be reciprocated;

a removable seal assembly mounted within said main body; said seal assembly sealingly engages a medial length of the outer surface of the valve stem and a medial length of the inner surface of the main housing axial passageway;

a valve seat formed at the lower end of said valve cartridge for engaging said valve element in a sealed manner;

said main housing includes an upper member and a lower member; means by which said upper and lower members are affixed to one another in a removable manner; said lower member has an internal circumferentially extending lower shoulder and said upper member has an internal circumferentially extending upper shoulder axially spaced from and confronting the shoulder of the lower member; means forming a seal cavity between the upper and lower shoulders;

the upper marginal end of the lower member is telescopingly received within the lower marginal end of the upper member, and further including an external shoulder formed on the lower member for engaging the lower terminal end of the upper member to thereby precisely space the confronting shoulders within the valve cavity so that the seal assembly can be received in close tolerance relationship respective thereto;

said axial passageway having a relative small inside diameter through said upper member which provides a valve stem guide, and a relative large inside diameter through said lower member which provides an annular gas passageway; means forming an inlet port into said lower member at a location between said seat and seal cavity through which combustion gas can flow into the annular gas passageway;

said seal assembly is an elongated annular cylinder having upper and lower opposed ends, respectively, which abuttingly engage said upper and lower shoulders, respectively;

the opposed ends of the seal assembly are arranged whereby the opposed seal means thereof sealingly engage the opposed ends of the seal cavity;

a portion of the passageway in the lower member is radially spaced from the valve stem to form said annular gas passageway through which gas can flow from said port into the annular gas passageway and through the valve seat when the valve stem has been moved to an open position.

* * * * *